United States Patent [19]

Mamantov et al.

[11] 4,063,005

[45] Dec. 13, 1977

[54] CATHODE FOR MOLTEN SALT BATTERIES

[75] Inventors: Gleb Mamantov, Knoxville, Tenn.; Roberto Marassi, Camerino, Italy

[73] Assignee: The United States of America as represented by the United States Energy Research and Development Administration, Washington, D.C.

[21] Appl. No.: 734,836

[22] Filed: Oct. 22, 1976

[51] Int. Cl.$^2$ ............................................ H01M 10/39
[52] U.S. Cl. .................................... 429/103; 429/104; 429/218
[58] Field of Search ............... 429/101, 102, 103, 199, 429/218, 104

[56] References Cited

U.S. PATENT DOCUMENTS

| 3,770,503 | 11/1973 | Brabson, Jr. et al. ........... 429/218 X |
| 3,966,491 | 6/1976 | Mamantov et al. ................... 429/103 |

Primary Examiner—Anthony Skapars
Attorney, Agent, or Firm—Dean E. Carlson; Stephen D. Hamel; Allen H. Uzzell

[57] ABSTRACT

A molten salt electrochemical system for battery applications comprises tetravalent sulfur as the active cathode material with a molten chloroaluminate solvent comprising a mixture of $AlCl_3$ and MCl having a molar ratio of $AlCl_3$/MCl from greater than 50.0/50.0 to 80/20.

10 Claims, No Drawings

CATHODE FOR MOLTEN SALT BATTERIES

BACKGROUND OF THE INVENTION

This invention was made in the course of, or under, a contract with the Energy Research and Development Administration. It relates in general to molten salt batteries and, in particular, to batteries having molten chloroaluminate solvents and cathodes comprising positive oxidation states of sulfur. Such a battery is described in commonly assigned U.S. Pat. No. 3,966,491 for "Molten Salt Electrochemical Systems for Battery Applications" issued June 29, 1976 to Gleb Mamantov, Roberto Marassi, and James Q. Chambers, the disclosure of which is herein incorporated by reference.

The battery described in U.S. Pat. No. 3,966,491 comprised a cathode of sulfur having a positive oxidation state of +1 or less. It was therein disclosed that the molten salt electrolyte for both cathode and anode compartments was a mixture of $AlCl_3/NaCl$ having a mole ratio of from 49/51 to 80/20. In a specific example, the electrolyte comprised a salt mixture of $AlCl_3/NaCl$ mole ratio of 49.8/50.2, the cathode compartment containing 0.5 gram of sulfur. The cell was charged by anodizing a tungsten or carbon charge collector in the cathode compartment. The potential measured relative to an external aluminum reference rose from 1.1 to 2.2 volts during charging. A significant improvement in such a battery would be achieved if sulfur could be oxidized to a higher oxidation state than +1, thereby resulting in a higher power/weight ratio. A molten salt concentration cell with aluminum electrodes is described in U.S. Pat. No. 3,770,503 to Brabson et al.

SUMMARY OF THE INVENTION

It is an object of this invention to provide a battery system of higher potential and higher energy density than achieved in the prior art.

It is a further object of this invention to provide a cathode system for battery applications. It is a further object to provide tetravalent sulfur ($S^{4+}$) as an active cathode material.

These and other objects are achieved according to our invention by providing in an electrochemical battery system comprising a partitioned cell having an anode compartment containing an anode and a cathode compartment containing a cathode and a first molten salt mixture comprising $AlCl_3$ and MCl, M being an alkali metal, the improvement in which said cathode comprises sulfur in the +4 oxidation state and said first molten salt mixture has an $AlCl_3/MCl$ mole ratio of greater than 50.0/50.0 and up to 80/20. Unless stated otherwise, the $AlCl_3/MCl$ mole ratios given for our system refer to the ratios when the batteries are in a charged condition. At full charge, it is preferred that the molten salt mixture in the cathode compartment have an $AlCl_3/MCl$ mole ratio of from about 60/40 to 75/25. At least 60/40 is needed to provide reasonable operating periods and at above 75/25 two phases are likely to exist in the salt. When the anode is aluminum, the anode compartment may also contain a molten mixture of $AlCl_3$ and MCl. If the molten salt mixture in the anode compartment is saturated with MCl, the maximum potential difference is achieved between the anode and the cathode, corresponding to the maximum open circuit voltage for the system. This maximum voltage can be sustained throughout the discharge of the battery if the anode compartment contains sufficient excess MCl as a solid phase such that the molten anode mixture remains saturated with the MCl when the battery is completely discharged. The preferred anode material is aluminum because of its low equivalent weight. Other suitable anode materials include calcium, sodium, magnesium, and lithium. It is preferred that the cathode compartment of the battery system be sealed to prevent the transfer of any gaseous materials during operation. During operation of the battery, the charge is carried through a separator by M+ ions. The preferred separator material is β-alumina which readily conducts sodium ions.

DETAILED DESCRIPTION

According to our invention, a battery having a high power-to-weight ratio comprises a partitioned cell having a cathode compartment and an anode conmpartment, the cathode compartment containing a molten chloroaluminate salt. The molten chloroaluminate salt is a mixture of $AlCl_3$ and MCl, where M is an alkali metal. The temperature prevailing within our system need only be high enough to prevent the salt from freezing. Some compositions are liquid as low as 115° C, however, 150°–170° C is required in many cases. In the cathode compartment, the cathode comprises sulfur in the tetravalent oxidation state dissolved in chloroaluminate salt having a molar concentration ratio of $AlCl_3/MCl$ within the range of from above 50.0/50.0 up to 80/20. This concentration range is the acidic range for the salt mixture. For purposes of this system, an acid is defined as a $Cl^-$ acceptor and a base is a $Cl^-$ donor. It is critical to the efficient operation of our battery system that the $AlCl_3/MCl$ mole ratio in the cathode compartment be more than 50.0/50.0. We have found that only when the $AlCl_3/MCl$ mole ratio is more than 50.0/50.0 is the tetravalent sulfur species of our invention stable in the molten salt. If the $AlCl_3/MCl$ mole ratio is 50.0/50.0 or below, the salt mixture is not acidic, with a $Cl^-$ concentration several orders of magnitude greater than in the acidic salts. It is believed that the stability of the tetravalent sulfur is adversely affected by an excess of chloride ions; hence, the observed instability in molten salts having $AlCl_3/MCl$ mole ratios 50.0/50.0 or below. One method of supplying the tetravalent sulfur within the cathode compartment is by adding a tetravalent sulfur salt such as $SCl_3AlCl_4$. This salt can be synthesized by contacting a stoichiometric mixture of S and $AlCl_3$ at room temperature with excess chlorine and heating the mixture to about 150° C in excess chlorine to complete the reaction. A detailed example of a synthesis for this salt can be found in Revue de Chimie Minerale t.6 (1969) pages 795 –815. The cathode compartment also contains a charge collector such as a tungsten coil or a carbon rod for conducting electric current from the battery. The charge collector can be any metal or conductor which does not react with the molten salt. Other possible materials include Au and Mo. Alternately, the tetravalent sulfur in the cathode compartment can be provided by dissolving elemental sulfur or a sulfur compound such as $M_2S$ and $S_2Cl_2$ (which add no extraneous ions to the melt) and then anodizing the charge carrier by passing current through the cell in the direction opposite of the battery output. To achieve full oxidation, 4 Faradays of charge per mole of elemental sulfur are needed. Of course, various salts would require various amounts of charge. Because tetravalent sulfur is present in our cathode compartment, the energy density of our present system is greatly enhanced over the system disclosed in U.S. Pat. No. 3,966,491. The equivalent weight of tetravalent sulfur is one-fourth the equivalent weight of monovalent sulfur and the energy density is inversely proportional to the equivalent weight.

Of course, it is desirable that the cathode compartment contain as much oxidized sulfur as possible upon full charge and it is within the skill of the art to determine the maximum sulfur concentration compatible with a system.

The anode can be any electropositive metal, however, greater energy densities are obtained with metals having low equivalent weights such as Al, Na, Li, Mg, and Ca. When an aluminum anode is used in our system, the anode compartment contains molten chloroaluminate salt in contact with the anode. The molten chloroaluminate salt in the anode compartment, also a mixture of $AlCl_3$ and MCl, can have an $AlCl_3$/MCl mole ratio anywhere between the saturation concentration of MCl and up to 80/20. For example, the MCl saturation molar ratio for the $AlCl_3$/NaCl system is at 49.75/50.25 at 175° C. When Al is the anode, the separator can be any porous material such as fritted glass. The function of the separator in our battery system is to minimize mixing of the salts between the compartments and provide an ionic pathway for charge transfer. As the battery discharges, M+ ions migrate from the anode compartment to the cathode compartment through the separator until the chloroaluminate salt in the cathode compartment becomes saturated with MCl. As mentioned earlier at an $AlCl_3$/MCl molar ratio of 50.0/50.0 or below, the tetravalent sulfur is unstable, resulting in a change in EMF as $S^{4+}$ chemically decomposes to S(I). Therefore, the preferred chloroaluminate salt concentrations for the respective salts is a higher $AlCl_3$/MCl ratio in the cathode compartment and a lower $AlCl_3$/MCl ratio in the anode conpartment.

The highest open circuit voltage can be obtained with an Al anode when the molten salt in the anode compartment is saturated with MCl at all times. This can be achieved by having sufficient excess of MCl present as a solid phase to continuously supply MCl to the melt as M+ ions are conducted through the separator to the cathode compartment. The amount of excess needed can be readily calculated since at least four equivalent weights of MCl are lost from the anode conpartment for each mole of sulfur which is reduced during discharge. Aside from weight considerations, additional NaCl in the anode compartment would not be detrimental, so one could routinely determine the amount of excess MCl needed to keep the anode salt saturated up until complete discharge.

The preferred composition of the chloroaluminate salt in the cathode compartment is the highest attainable without resulting in excessive volatility or sacrifice in conductivity. The upper limit of $AlCl_3$/MCl mole ratio is about 80/20. For an $AlCl_3$/NaCl mixture the optimum conditions of high open circuit voltage and high electrical conductivity can be obtained with an $AlCl_3$/NaCl ratio of about 63/37 in the cathode compartment and 49.75/50.25 in the anode compartment at 175° C. It should be noted that under these conditions an open circuit voltage of about 2.56 volts can be obtained with 1.92 volts at full discharge. As the battery discharges, the voltage remains essentially constant until the molten salt in the cathode compartment goes basic ($AlCl_3$/NaCl mole ratio less than 50.0/50.0) near full discharge. If both compartments initially contain salts having $AlCl_3$/NaCl molar ratios of 63/37, the maximum open circuit voltage obtainable is 1.96. If both compartments contain $AlCl_3$/NaCl mixtures saturated in NaCl, the maximum open circuit voltage obtainable is about 1.92 as in the discharged cell. Of course, when the catholyte is saturated with NaCl, tetravalent sulfur is not present.

A rechargeable battery according to our invention should have the cathode compartment sealed to contain gaseous $S_2Cl_2$ which may be evolved when the melt becomes basic. Upon recharging, gaseous $S_2Cl_2$ will be oxidized at the current collector surface to again form a tetravalent sulfur species.

It is not known for certain the form in which tetravalent sulfur exists within the molten salt. The existence of tetravalent sulfur has been shown by voltammetric diffusion current measurements, controlled-potential coulometric oxidation of sulfur and Raman spectrometric measurements. We have found that sulfur can be oxidized during charging to the $S^{4+}$ state in our system without first oxidizing $Cl^-$ to $Cl_2$. It is believed that the tetravalent sulfur exists in the molten chloroaluminate salt as $SCl_3^+$. During discharge, the $SCl_3^+$ is reduced to $S_2^{2+}$ and to $S_8^{2+}$ and elemental sulfur. It is the reversibility of each of the electrochemical couples and the stability of $S^{4+}$ in our system which permits the use of $S^{4+}$ as a cathode.

For an aluminum anode, the most likely half cell reactions during discharge are:

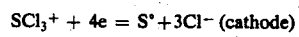

$SCl_3^+ + 4e = S° + 3Cl^-$ (cathode)

$Al + 4Cl^- = AlCl_4^- + 3e$ (anode)

and the overall cell reaction would be $3 SCl_3^+ + 4Al + 7Cl^- = 3S° + 4AlCl_4^-$ with M+ ions carrying positive charge from the anode compartment to the cathode compartment. Of course, we do not intend our invention to be limited by this theory but only by the claims.

The following examples demonstrate the operation of our battery cathode system. The examples are not intended to be limiting, the invention being limited only by the claims.

Example I

The cathode compartment contained 23.0 grams of molten $AlCl_3$-NaCl (54–46 mole %) + 0.102 grams sulfur + a tungsten coil current collector. The anode compartment contained 22.3 grams of molten $AlCl_3$–NaCl (54–46 mole %) and a heavy wire aluminum spiral. The compartments were separated by an alumina frit. The cathode potential was measured with respect to an aluminum reference electrode contained in an $AlCl_3$/NaCl melt saturated with NaCl which was enclosed in a thin-walled Pyrex bulb. The cell was charged by applying a constant current of 50 mA until 1018 coulombs had been passed. To completely oxidize the sulfur to the tetravalent state would have required 1235 coulombs. During charging (anodization) the cathode potential increased from 1.75 volts to 2.5 volts. The cell was discharged at 40 mA, passing a total of 400 coulombs. During this discharging, the cathode potential decreased to 2.4 volts. After passing an additional 300 coulombs, the cathode potential decreased to 2.0 volts.

Example II

In this example, S(IV) was added as $SCl_3AlCl_4$. The cathode consisted of 23.7 grams of $AlCl_3$/NaCl melt with a mole ratio of 63/37 + 2.51 grams $SCl_3AlCl_4$ and a spiral tungsten charge collector. An auxiliary anode for discharging the battery contained 25 grams of molten $AlCl_3$/NaCl (52/48 mole ratio) + 0.33 grams S with a tungsten charge collector. The reference electrode was an aluminum wire in a 63/37 mole ratio, $AlCl_3$/NaCl melt. The open circuit voltage was measured between the cathode and the reference electrode to be 2.0 volts. After passing 1755 coulombs, the cathode potential was 1.93 volts. This example therefore demonstrates that tetravalent sulfur can be added as a solid compound and that a cathode potential with respect to an aluminum reference electrode of about 2.0 volts was obtainable without a difference between the $AlCl_3$/MCl ratios between the anode and the cathode compartments.

When sodium is the anode in our system, it may be in the form of molten sodium separated from the cathode compartment and the molten salt by a porous separator selectively permeable to $Na^+$ ions. An example of such a separator is $\beta$-alumina, which has been proposed for Na-S batteries. A method for preparing $\beta$-alumina is described by J. T. Kummer in "Progress Solid State Chemistry", Vol. 7 (1972) pp. 141-175 which are herein incorporated by reference.

It will be apparent to those skilled in the art that a wide variety of battery systems with $S^{4+}$ cathodes and $AlCl_3$-NaCl molten salts can be made according to the general teachings of this disclosure and such devices and obvious modifications thereof are intended to be within the scope of our invention.

What is claimed is:

1. In an electrochemical battery system comprising a partitioned cell having an anode compartment containing an anode and a cathode compartment containing a cathode and a first molten salt mixture comprising $AlCl_3$ and MCl, M being an alkali metal, the improvement in which said cathode comprises sulfur in the +4 oxidation state and said first molten salt mixture has an $AlCl_3$/MCl mole ratio of greater than 50.0/50.0 and up to 80/20.

2. The battery system of claim 1 in which said anode comprises aluminum.

3. The battery system of claim 2 in which said anode compartment contains a second molten salt mixture comprising $AlCl_3$ and MCl in contact with said anode, said second molten mixture being saturated with MCl.

4. The battery system of claim 3 in which said anode compartment contains sufficient excess MCl as a solid phase such that the second molten mixture remains saturated with MCl throughout discharge of said battery system.

5. The battery system of claim 1 in which said cathode compartment is sealed such that gaseous products generated during discharge of said battery system are contained within the cathode compartment.

6. The battery system of claim 1 in which said anode is sodium.

7. The battery system of claim 6 in which said anode compartment and said cathode compartment are separated by a porous $\beta$-alumina partition.

8. The battery system of claim 1 in which M is Na.

9. The battery system of claim 1 in which the $AlCl_3$/MCl mole ratio of said first molten salt mixture is within the range of 60/40 to 75/25.

10. The battery system of claim 1 in which active cathode material consists essentially of sulfur in the +4 oxidation state.

* * * * *